July 11, 1939.　　　G. VACCARO　　　2,165,668
EYE PROTECTOR
Filed April 4, 1938
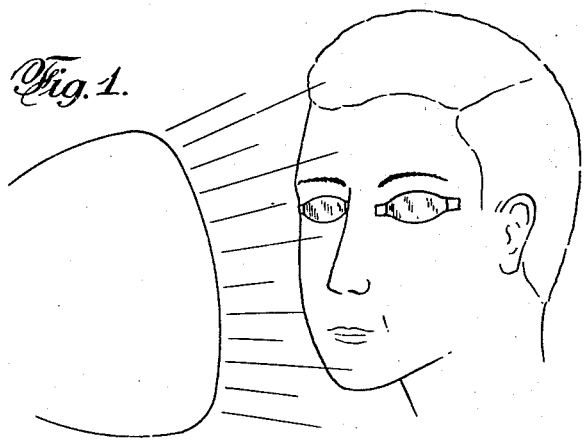
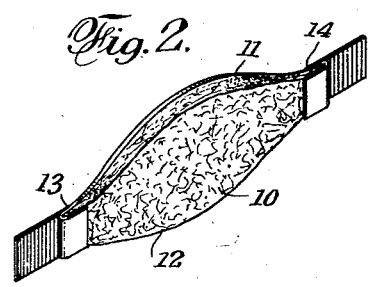
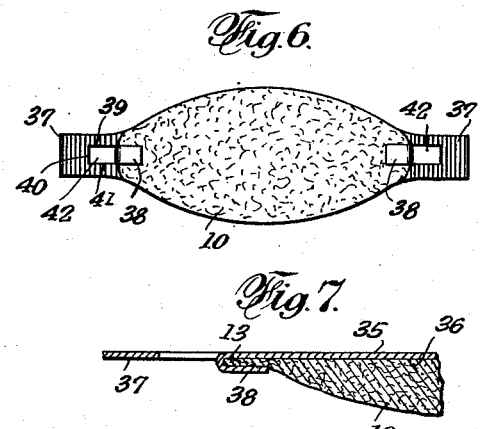
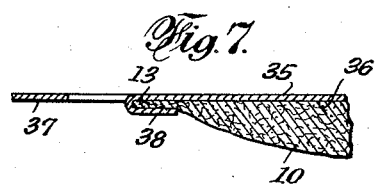
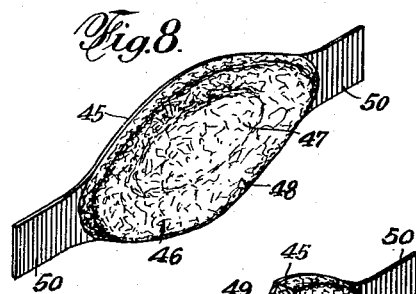
INVENTOR
George Vaccaro
BY
ATTORNEY Patented July 11, 1939

2,165,668

UNITED STATES PATENT OFFICE 2,165,668

EYE PROTECTOR

George Vaccaro, New York, N. Y., assignor of one-half to Harry Jacobson, New York, N. Y.

Application April 4, 1938, Serial No. 199,764

9 Claims. (Cl. 2—15)

This invention relates to eye protectors and particularly to that type intended for a single use only.

It is customary to protect the eyes of a person exposed to the rays emanating from certain types of electric lamps, such as "sunray" lamp, from the harmful effects of certain rays such as the ultraviolet rays thereof. This has heretofore been done by means of colored glasses or goggles worn on the head and covering the eyes. Such goggles are used frequently by different customers and become dirty and contaminated from such use and therefore, likely to transmit germs from one person to another.

Further, in the treatment of customers in beauty shops as by means of massages, clay packs or various hair treatments, the eyes of the person being treated need frequently be protected from the effects of chemicals, medicines or the like applied to the head and which might accidentally reach the eyes.

My invention therefore contemplates the provision of an inexpensive and therefore discardable eye protector provided with means impervious to the harmful rays of a sunray lamp and adapted to be placed over each eye to protect the eyes of the person being treated either by such lamp or by any of the other treatments above mentioned.

My invention further contemplates the provision of a sanitary pad impervious to harmful rays which may be quickly and easily secured in place over the eye to protect the eye and easily removed after performing its function and which is inexpensive enough to permit it to be discarded after a single use.

My invention further contemplates the provision of a soft pad shaped to fit the eye socket and provided with adhesive means to secure the pad over the eye of the wearer to protect the eye during treatment by a sunray lamp or treatment of the head or face of the wearer.

The various objects of the invention will be clear from the description which follows and from the drawing, in which, Fig. 1 is a perspective view of my invention as it appears in operation during the treatment of a person by a sunray lamp.

Fig. 2 is a perspective view of my new protector.

Fig. 3 is a top plan view of the same.

Fig. 4 is a similar view of a modified form of the protector.

Fig. 5 is a similar view of another modified form of the protector.

Fig. 6 is a rear view of another modified form of the protector wherein a single sheet is designed to hold the pad ends in place and also to provide adhesive attaching tabs and a backing for the pad.

Fig. 7 is a horizontal section of the same.

Fig. 8 is a perspective view of another modified form of the protector wherein the protector is curved or shaped to fit the eyeball.

Fig. 9 is a similar fragmentary view of the same, partly in section.

In the practical embodiment of my invention which I have shown by way of example, I prefer to make the soft pad portion of my new protector of a sheet 10 of sterilized absorbent cotton of the type which is now in common use. Such cotton sheets are lapped or laminated and customarily rolled into a cylinder when sold. The pad 10 is preferably widest at its middle, having a preferably convex upper edge 11 and a similar lower edge 12, spaced apart the proper distance to give the pad the general shape of the eye socket, said edges converging towards the respective ends 13 and 14 of the pad. The paper sheet pad covering 15 is coextensive with and of the same shape as the pad 10 and may be cut, if desired, simultaneously with the cutting of the pad by overlaying the paper sheet and the cotton sheet from which the pad and covering are made. The paper covering 15 is of colored paper, partly, if not entirely, impervious to the harmful rays of a sunray lamp.

To hold the ends 13 and 14 of the pad down on the sheet 15, adhesive means, comprising in Figs. 2 and 3, the holding members 16 and 17, are employed. Said holding members being substantially identical, a description of one will suffice for both. Each consists of a sheet of paper or the like gummed on its inner surface and folded in half, so that the outer half adheres to the outer surface of the sheet 15, and the inner half adheres to the innermost surface of the pad 10. The members 16 and 17 enclose the end portions 13 and 14 of the cotton pad. It being understood that the fibres in the pad 10 are arranged in a generally longitudinal direction, the various layers or laminations of said pad are held by the members 16 and 17 against substantial separation, though the ends 13 and 14 of the pad may be slightly compressed by said members to make its thickness less than that of the thickness of the central portion of the pad and thereby to afford the greatest protection to the eye where it is most needed. By cutting the pad from the sheet so that the fibres run substantially lengthwise, the tendency of the pad to disintegrate during shipment and handling is effectively prevented.

For providing attaching means for the pad, the tabs 18 and 19, gummed on their inner faces, are respectively secured at the inner ends thereof to the respective outer halves of the members 16 and 17, to provide a projecting portion on each tab as 20, adapted to be adhesively secured to the face of the wearer either at the inner corner or the outer corner of the eye socket. My improved protector being preferably symmetrical about its vertical center line, it is immaterial whether the pad is used over the right or left eye, or whether it is used with the edge 11 or the edge 12 uppermost.

In use, the gummed surfaces of the projections 20 are moistened, the pad 10 is placed over the eye and the projections 18 and 19 pressed into place against the skin of the user at the corners of the eye socket. The sheet 15 cooperating with the pad 10, serves effectively to keep out ultraviolet or other rays which might harm the eye, the pad fitting the eye socket with sufficient accuracy to prevent any chemicals or hair or facial treating materials from accidentally reaching the eye. After it is used, the protector may be easily removed with or without moistening the attaching tabs and without hurting the wearer.

In that form of the invention shown in Fig. 4, a single paper sheet as 21, preferably gummed throughout its inner surface 22, is used as the covering for the pad 10. Said sheet is of the same general shape as the sheet 15, but is provided with suitable end extensions reduced in width to take the place of the members 16 and 18. The surface 22 having been moistened, the pad 10 is placed on said surface to adhesively secure it thereto, whereafter part of the end portion 23 of the sheet is folded on to the inner surface 24 of the pad, the terminal portion 25 of the projection then being folded back on itself and in its final position projecting outwardly beyond the portion 23 and beyond the pad to expose the adhesive thereon for ready attachment over the eye and at the corners of the eye socket, as has been previously described in connection with the modification of Figs. 2 and 3. In this form of the invention, a single covering sheet of material coated with adhesive is used, which has the triple function of cooperating with the pad to keep out harmful rays from the eye, to hold the ends 13 and 14 of the pad down on the sheet 21, and to provide the attaching means 25.

In that form of the invention shown in Fig. 5, three pieces of material, such as paper, are used in connection with the pad. The sheet 30 of the same general shape as the pad and the sheets 15 and 21, is coated with adhesive on its inner surface 31, the end portions 32 thereof being folded on to the inner surface 24 of the pad 10 and adhesively secured thereto. The main inner surface of the sheet 30 is similarly secured to the outer surface of the pad 10. Separate attaching tabs as 33 are provided, said tabs being similar to the tabs 18 of Fig. 3 and hence, need not be described in detail.

Referring now to that form of the invention shown in Figs. 6 and 7, I have there shown a single covering sheet 35 gummed throughout its inner surface 36 and adhesively secured to the pad 10 at said surface. To provide means for holding the ends 13 and 14 of the pad on to said sheet 35, a portion 38 of the material of the projecting ends 37 of the sheet is severed from the sheet as by means of the severing cuts 39, 40 and 41. The tab 38 thus formed, is folded onto the outer surface of the pad 10 and adhesively secured thereto. The remainder of the projections or tabs 38 being coated with adhesive, serve as attaching tabs in the manner of the projecting tabs 18 and 33. It will be understood that in this form of the invention, the ends 13 of the pad may be slightly elongated so as to cover completely the corner of the eye socket and to prevent light or rays from reaching the eye through the opening 42 left when the flap 38 is folded from the tabs 37.

As shown in Figs. 8 and 9, the covering sheet 45 may be curved convexly outwardly so as to more accurately fit the eye ball. Similarly, the pad 46 may be reduced in thickness at its center portion 47 to provide the hollow inner surface 48 on the pad. In this form of the invention, the sheet 47 is coated with adhesive on its inner surface 49 and terminates in the attaching projections 50, made integrally with the sheet 45 in the same way as the sheet 35 and projections 37 are formed. Or, the tabs 50 may be made of a separate piece of material secured to the sheet 45 in the manner of the tabs 18 and 33.

In any case, whether the covering sheet is flat or curved, or whether the inner surface of the pad is convex or concave, the general outline of the protector corresponds to the outline of the eye socket, the covering sheet is at least partly impervious to the harmful rays of a sunray lamp and in connection with the pad cooperates to completely keep out such harmful rays and suitable gummed attaching tabs are provided on the pad for securing the pad at the corners of the eye socket.

It will be seen that I have provided a simple, sanitary and efficient eye protector which can be readily attached in place and readily removed and discarded after a single use and that I have provided means well designed for the purpose for which it is intended.

While I have shown and described certain specific embodiments of my invention, I do not wish to be understood as limiting myself thereto, but intend to claim the invention as broadly as may be permitted by the state of the prior art and the scope of the appended claims.

I claim:

1. A sanitary eye protector for use once only on one eye of the wearer and discardable after such use and of the general shape of the eye socket comprising a fibrous pad, a flat flexible sheet backing for the pad, means for securing the pad to the sheet comprising a pair of comparatively narrow and elongated flexible sheet members projecting from the sheet backing and each folded over and substantially enclosing an end portion of the pad and secured to the front face of the pad at said end portion, and opposed end tabs on the protector coated with adhesive on the faces thereof nearest the pad and arranged respectively to engage the outer corner of one eye socket of the wearer and the opposite corner and bridge of the nose.

2. An eye protector for use once only and reversible end for end comprising an elongated comparatively wide and thin soft pad, a flexible sheet on one face of the pad, means for adhesively securing the pad to the sheet, and gummed attaching tabs at and extending from the ends of the protector and spaced apart a sufficient distance to engage the corners of the eye socket when the protector is arranged over the eye of the wearer, said tabs constituting a means for obstructing the entrance of light and other rays into the eye at said corners, one of said tabs being of sufficient length to engage part of the bridge of the wearer's nose.

3. An eye protector reversible end for end and impervious to the harmful rays of a sun lamp comprising a thin, comparatively wide absorbent cotton pad, a flat paper outer sheet covering and coextensive with the pad, adhesive means for fixedly securing at least the end portions of the pad to the sheet and a substantially rectangular gummed paper tab projecting longitudinally from each end of the protector and adapted to be removably secured at the corners of the eye of the wearer and of sufficient length to cover the inner corner of the eye, and to engage the nose of the wearer.

4. An eye protector for use once only on one eye and reversible end for end comprising a flat paper sheet and a coextensive pad adhesively secured together and shaped to fit the eye socket, and a narrower substantially rectangular gummed paper attaching tab at each end of the protector and of sufficient length and width to cover the corner of the wearer's eye and to engage the side of the nose.

5. An eye protector reversible end for end and comprising a flat paper backing sheet, an absorbent cotton pad on the sheet and means for securing the pad to the sheet, said sheet and pad being of elongated form and having side edges curved to conform to the outline of the eye socket and being impervious to those rays of a sun lamp which harmfully effect the eye, and opposed rectangular end tabs extending from the protector and coated with adhesive and of less width than that of the remainder of the protector but of sufficient length and width to cover the corner of the wearer's eye and to engage the side of the nose of the wearer, said tabs being adapted to be adhesively secured to the opposed corners of the eye socket to removably secure the protector over the eye with the sheet on the outside and the pad adjacent the eye.

6. An eye protector comprising a paper sheet shaped to fit the eye socket of the wearer, a cotton pad coextensive with the sheet, a holding member for the ends of the pad at each end of the protector in the form of a folded paper element having part thereof adhesively secured to the outer face of the paper sheet and the remainder adhesively secured to the inner face of the pad, and a paper attaching tab coated on its inner face with adhesive and adhesively secured to the outer face of each of said folded paper elements.

7. An eye protector comprising a paper sheet and a cotton pad arranged in face to face relation, a paper member at each end of the sheet folded about the ends of the sheet and the pad and coated on one face with adhesive, and adhesively securing the adjacent ends of the sheet and pad together, and a paper attaching tab projecting from each end of the protector and coated with adhesive on its inner face and constituting means for removably securing the protector to the corners of the eye and the nose of the wearer.

8. A sanitary eye protector for use once only and discardable after said use, said protector being of the general shape of the eye socket having outwardly convex edges and being widest at its middle and narrowest at its ends, said protector comprising a flat paper sheet and a laminated absorbent cotton pad on the sheet, said sheet and pad being coextensive, said sheet being impervious to the harmful rays of a sun lamp, means for adhesively securing the pad to the sheet, and a substantially rectangular gummed paper tab at each end of the protector.

9. An eye protector reversible end for end and impervious to the harmful rays of a sun lamp comprising a comparatively wide and thin soft pad, a flexible sheet on one face of the pad, means for securing the pad to the sheet, and attaching tabs on and forming part of the protector, said tabs being coated with adhesive and being adapted to be secured adjacent the corners of the eye of the wearer, said tabs being of such length that one of said tabs engages part of the bridge of the wearer's nose when the protector is in its operative position over the eye of the wearer.

GEORGE VACCARO.